(12) United States Patent
Chen (10) Patent No.: US 9,736,910 B2
(45) Date of Patent: Aug. 15, 2017

(54) LIGHTING SYSTEM THAT SELF DETECTS THE RELATIVE PHYSICAL ARRANGEMENT OF ITS SOURCES

(71) Applicant: Nancy H. Chen, North Andover, MA (US)

(72) Inventor: Nancy H. Chen, North Andover, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/870,076

(22) Filed: Sep. 30, 2015

(65) Prior Publication Data
US 2017/0094750 A1    Mar. 30, 2017

(51) Int. Cl.
| | |
|---|---|
| *H05B 37/02* | (2006.01) |
| *G01B 7/14* | (2006.01) |
| *G01B 15/00* | (2006.01) |
| *G01B 21/16* | (2006.01) |
| *H04W 4/00* | (2009.01) |
| *H04W 40/24* | (2009.01) |

(52) U.S. Cl.
CPC ........... *H05B 37/0227* (2013.01); *G01B 7/14* (2013.01); *G01B 15/00* (2013.01); *G01B 21/16* (2013.01); *H04W 4/008* (2013.01); *H04W 40/244* (2013.01)

(58) Field of Classification Search
CPC ...... H05B 37/0227; G01B 7/14; G01B 15/00; G01B 21/16; H04W 4/008; H04W 40/244
See application file for complete search history.

(56) References Cited

U.S. PATENT DOCUMENTS

| | | | | |
|---|---|---|---|---|
| 2006/0074494 | A1* | 4/2006 | McFarland | G05B 15/02 700/1 |
| 2008/0218334 | A1* | 9/2008 | Pitchers | H04L 41/0893 340/539.1 |
| 2010/0035546 | A1 | 2/2010 | Simons et al. | |
| 2011/0031897 | A1* | 2/2011 | Henig | H05B 37/0254 315/297 |
| 2011/0057581 | A1* | 3/2011 | Ashar | G01S 11/12 315/312 |

(Continued)

OTHER PUBLICATIONS

Ionescu, Georgia, et al., "Improving Distance Estimation in Object Localisation with Bluetooth Low Energy," SENSORCOMM 2014, p. 45-49, ISSN: 978-1-61208-374-2, available at http://tam.unige.ch/assets/documents/publications/SENSORCOMM2014_Ionescu.pdf.

(Continued)

*Primary Examiner* — Tung X Le
*Assistant Examiner* — Raymond R Chai
(74) *Attorney, Agent, or Firm* — Yutian Ling (57) ABSTRACT

Systems and methods are disclosed that allow a lighting system to self-determine the relative positions of its different light sources. Direct light source to light source distances are measured and trilateration is used to locate each light source in three dimensional space. The relative position of each light source is provided with regard to the lighting system itself and does not need to refer to a GPS system or to the position or orientation of the installation. The self-determining system allows lighting systems to be quickly installed and later commissioned using the positioning information provided by the lighting system itself.

19 Claims, 5 Drawing Sheets

(56) References Cited

U.S. PATENT DOCUMENTS

| | | | | |
|---|---|---|---|---|
| 2013/0109406 A1* | 5/2013 | Meador | ................. | H04L 67/125 |
| | | | | 455/456.1 |
| 2013/0221203 A1 | 8/2013 | Barrilleaux | | |
| 2014/0022793 A1 | 1/2014 | Apte et al. | | |
| 2016/0154088 A1* | 6/2016 | Holtman | ................... | G01S 5/16 |
| | | | | 382/106 |

OTHER PUBLICATIONS

Medina, Carlos, et al., "Ultrasound Indoor Positioning System Based on a Low-Power Wireless Sensor Network Providing Sub-Centimeter Accuracy," Sensors 2013, 13, 3501-3526, Mar. 13, 2013, available at https://www.ncbi.nlm.nih.gov/pmc/articles/PMC3658758/pdf/sensors-13-03501.pdf.

Anderson, Chris, "A clever approach to indoor beacons: ultrasound + IR = GPS," DIY Drones, Mar. 18, 2008, available at http://diydrones.com/profiles/blogs/705844:BlogPost:29412 (last accessed Jan. 18, 2017).

Kern, Olivier, International Search Report and Written Opinion of the International Searching Authority, for counterpart application PCT/US2016/051803, Dec. 20, 2016, European Patent Office, Rijswijk, The Netherlands, 12 pages.

Jovanovic, Natasa, et al., "Iterative node localization for intelligent street lighting," 2013 Fifth International Conference on Ubiquitous and Future Networks (ICUFN), IEEE, Jul. 2, 2013, pp. 679-684, XP032492325, ISSN: 2165-8528.

* cited by examiner

LIGHTING SYSTEM THAT SELF DETECTS THE RELATIVE PHYSICAL ARRANGEMENT OF ITS SOURCES

FIELD OF THE DISCLOSURE

The present disclosure relates to lighting systems and, in particular, to determining the relative positions of light sources in the lighting system.

BACKGROUND

Lighting systems can consist of multiple light sources, or luminaires, that can be positioned in an infinite number of spatial arrangements. The three-dimensional position of each light source is important for commissioning the lighting system. By knowing the position of each light source in relation to the remaining light sources, each individual light source can be predictably tuned to achieve the desired lighting effect. One way of determining the position of each light source is to physically measure and record the position of each light source in space (x, y and z coordinates). Light sources can also be installed according to a pre-determined three-dimensional plan.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

In one aspect, a lighting system is provided that can self-determine the relative physical position of each of its lighting sources. By knowing the relative physical arrangement of each of the available light sources in a space, the intelligent lighting system can deploy the available light sources to deliver a desired illumination pattern. The relative intensity of each of the sources can be adjusted to provide a more uniform intensity over the installation area regardless of the actual positioning in space of each of the light sources. Other illumination effects can also be achieved with minimal physical measurement or layout. A self-determining system can eliminate the need for physically measuring the location of each light source and can also eliminate the need for tediously installing light sources in a predetermined three-dimensional pattern. Automatic position determination can also eliminate mistakes made by incorrectly placing a light source in the wrong location. Automatic position determination also allows one or more light sources within a lighting system to be moved without having to manually re-commission the lighting system. The relative position of each light source can be determined in relation to other light sources in the lighting system without the need to provide specific location data for each light source. For example, the three-dimensional formation of light sources can be determined without the need to find the orientation of the system or the absolute position of the lighting system in a room, building or on earth. The lighting system can be rotated, raised, lowered, in motion or transferred around the world, and the devices and methods described herein can accurately determine the relative position of each light source in relation to the others without the need for use of global positioning systems or the need for determining the direction or orientation of the lighting system.

Multiple configurations and variations will be apparent in light of the present disclosure.

General Overview

As used herein, the intersource separation, or intersource separation distance, is the linear distance between two light sources. Once the intersource separation distances between the light sources in a lighting system are known, trilateration can be used to fix the relative position of most or all of the light sources, according to an embodiment of the present disclosure. The intersource separation does not need to be determined for every pair of light sources, but when each light source includes a distance sensor the intersource separation between all pairs can be quickly and automatically obtained. As used herein, a distance sensor is a feature that allows the lighting system to determine the intersource separation distance between two light sources. Examples of distance sensors are provided below.

The linear intersource separation distance between any two lighting sources in the system can be determined using various techniques as explained herein. Each light source can be equipped with a distance sensor or, in some cases, a single sensor that can determine intersource separation distances between pairs of light sources. These distance sensors include, for example, Bluetooth ®or other short-range wireless beacons, RFID tags and receivers and magnetic field sensors. In some embodiments, each of the lighting sources can be fitted with a short-range wireless beacon that is uniquely associated with that lighting source. While GPS technology could be used to determine the distance between light sources (based on absolute locations of each source), it is unnecessary for embodiments where direct distances between light sources are measured. Therefore, in some such embodiments, the system includes no GPS receivers. In one set of embodiments, the distance between any two of the light sources can be determined using Bluetooth ®low energy positioning methods. Other suitable methods, such as Wi-Fi positioning, will be apparent in light of this disclosure. As each of the light sources is generally stationary with respect to the lighting system the distance between any two light sources can be accurately measured. For even greater accuracy, separation measurements can be made during low noise conditions such as at night when interfering signals from humans, electrical fields, cell phones, radios etc. are at a minimum. In some embodiments, the intersource separation can be accurately measured to a standard deviation of less than 1 m, less than 0.5 m or less than 10 cm.

The relative position of the light sources in a lighting system may be determined and recorded in a number of ways. For example, each light source can be assigned three dimensional coordinates $x_n$, $y_n$ and $z_n$ in a three dimensional Cartesian system that has its origin $x_0$, $y_0$, $z_0$, at any location that is fixed with regard to the lighting system. For instance the origin can be a first light source, a processor location, a central point on the ceiling or a point on the floor. In another embodiment, the relative position of light sources can be determined and recorded using a vector based system where the position of each light source is defined by the direction and magnitude of a vector whose origin is at a fixed point such as a first light source, a processor location, a central point on the ceiling or a point on the floor. In any of the systems that can be used to record the position of the light sources, the systems can be independent and need not align or correlate with the installation space, the floor, the wall or any particular spot or orientation on earth.

Although all light sources have volume, for the calculations provided herein they are considered to be point sources having zero volume. For the purposes herein, all measurements from light source to light source can be considered to originate and end at a point centrally located in the light source. As the techniques used to measure intersource separations distances may not be precisely reproducible, multiple readings for the same separation distance may be taken and averaged in order to reduce error. For instance, 10, 100 or 1000 Bluetooth ®low energy readings for each pair of light sources can be taken and averaged. Statistical software can also be used to remove outliers and further refine the intersource separation data.

In some embodiments, the addition of specific spatial information can include, for example, information regarding the alignment of the light sources with respect to each other. For instance, in some cases all of the lights may be equidistant from a flat ceiling or wall and therefore will fall in the same plane. In other embodiments, an observer can provide information to the system that can help fix the position of one or more light sources. For example, an observer can identify a specific light source as being the uppermost or lowermost in the lighting system. Alternatively, a light source can be identified as being farthest left or farthest right. In another embodiment, an observer provides information regarding which two light sources are highest, lowest, most to the left, most to the right, which one is blinking, which one is red, which one is green, etc. In other embodiments, a camera can be used to provide additional information regarding the position of one or more light sources. For example, a camera can provide information to the lighting system that discloses whether a specific light source C is to the left or right of the line between light sources A and B. In another embodiment, a camera can provide depth information regarding each of the light sources. This depth information can include absolute or relative data regarding which light sources are farthest from the camera and which are closest. With this information, the light system can more accurately narrow down the positions for each of the light sources with respect to the lighting system as a whole.

In some embodiments, the lighting system may also include sensors, such as light sensors, that can detect the position of a light source with respect to another light source. For example, a first light source may include one, two, three or more light detectors. A second light source can then be briefly illuminated, sometimes with the first light source off, and the first light source reports which detector, if any, reported the strongest signal. If the position of the light detector on the first light source is known, the identification of the detector receiving the greatest illumination provides information regarding the direction of the incoming light and therefore the position of the first light source in relation to the second light source. Two or more light sources can be tested simultaneously or in sequence using the same procedure. The illumination source can be the same or different for each of the tests.

In another set of embodiments, one or more light sources can be equipped with a magnetic field detector that can detect the direction and/or magnitude of any magnetic fields that might be induced by current passing through one of the other components of the lighting system. The direction and/or magnitude of these fields can provide information regarding the relative position of the source in relation to the light source housing the detector. A light source equipped with such a detector could then help to localize other light sources when they are illuminated individually or in specific groups.

System Architecture and Operation

In one set of embodiments the relative position of each lighting source can be determined using trilateration. As used herein, relative position means the position of the light sources of interest in relation to the other light sources that comprise the lighting system. No information regarding latitude and longitude, altitude, or north-south orientation is required. By first determining the intersource separation distance between any two lighting sources in the system, trilateration provides a means for determining the three-dimensional relative position of each of the lighting sources. The intersource separation and/or the trilateration calculations can be performed using a processor. The processor may be incorporated into the lighting system or may be external to the lighting system. Once the intersource separation between light sources is determined, trilateration can be used to approximate or fix the relative 3-D position of each of the light sources that comprise the lighting system. The intersource separation provides the distance between two light sources but provides no information regarding the relative position of each of the two light sources.

Figure 1:
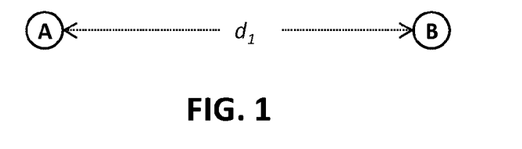
FIG. 1 is a diagram illustrating the intersource separation between two light sources.
Figure 2:
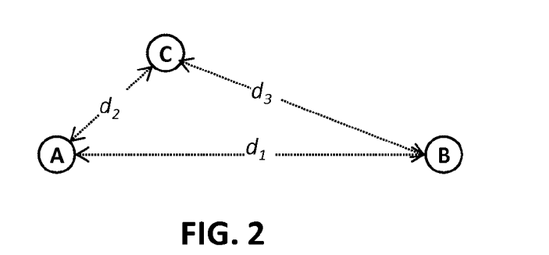
FIG. 2 is a diagram of one embodiment showing the relationship between three light sources.
Figure 3:
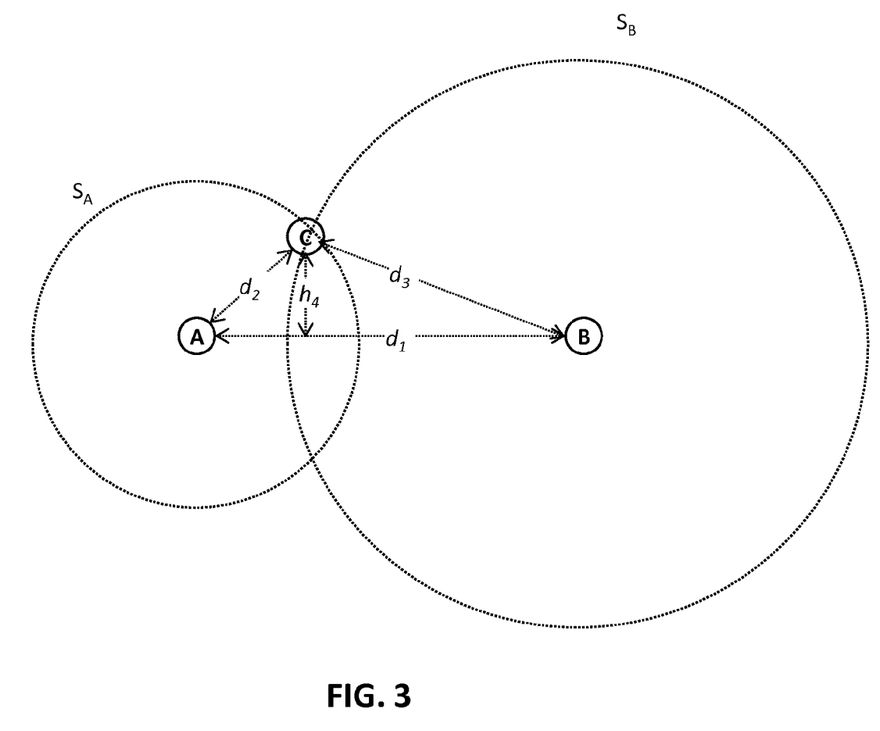
FIG. 3 is a diagram illustrating the use of trilateration to locate a light source in one embodiment including three light sources.

One example of the use of trilateration is provided in FIGS. 1-4. Using a distance sensor the intersource separation of two light sources A and B is found to be $d_1$ as shown in FIG. 1. In FIG. 2 a third light source, C, is added. Intersource separation information provides a distance of $d_2$ for the distance between light sources A and C and a distance of $d_3$ for the distance between light sources B and C. Given intersource separation distance $d_2$ it is known that light source C is positioned somewhere on the surface of an imaginary sphere, $S_A$, that has a radius of $d_2$ and an origin at light source A. See FIG. 3. Similarly, given intersource separation distance $d_3$, it is known that light source C is also positioned on a second sphere, $S_B$, having a radius of $d_3$ and centered at light source B. If $d_1=d_2+d_3$ or $d_2=d_1+d_3$ or $d_3=d_2+d_1$, then A, B and C are collinear. FIG. 3 provides a cross-sectional view of these spheres and their relationship to the light sources, which are in the plane of the figure. Light source C must be on the surface of both spheres $S_A$ and $S_B$ and will therefore be limited to the intersection of the two spheres. The intersection of these two spheres defines a circle having a radius $h_4$ which is normal to, and centered on, the line between light sources A and B. If $h_4$ can be determined then the position of light source C can be fixed in relation to light sources A and B. Line $h_4$ is the altitude of triangle ACB from vertex C to line AB. To determine the length of the altitude one first determines the area of triangle ABC. The area of triangle ABC can be calculated using Heron's formula:

$$Area = \sqrt{s(s-AB)(s-BC)(s-AC)}$$

AB is the intersource separation distance between A and B, BC is the intersource separation between B and C, and AC is the intersource separation between A and C. The term "s" is the semiperimeter of the triangle and can be calculated:

$$s = \frac{AB + BC + AC}{2}$$

Once the area of triangle ABC is known, radius $h_4$ can be calculated because it is the altitude of triangle ABC that extends from light source (vertex) C to line AB. The altitude of the triangle extending from vertex C can be calculated by dividing the area by the length of the base (AB in this case) and multiplying by 2:

$$Altitude = 2\frac{Area}{AB}$$

This altitude is $h_4$ and once $h_4$ is known, the position of each of the three light sources with respect to each of the other two light sources is known. Recall that light source C is positioned somewhere on a circle of radius $h_4$ and unless the actual orientation of the x-y plane is known, the absolute position of the three light sources cannot be fixed.

Figure 4:
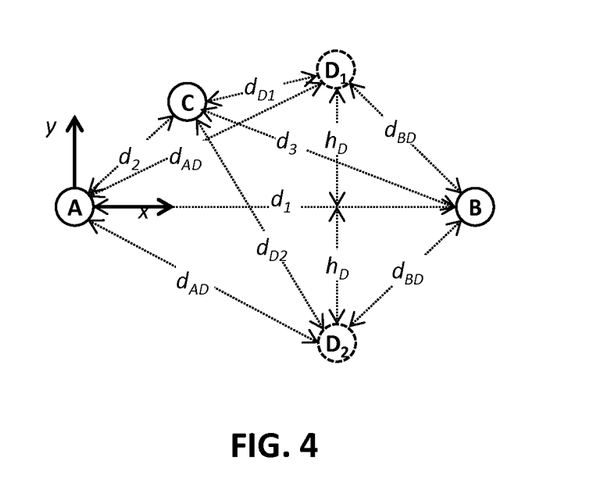
FIG. 4 is a diagram showing the relationship of multiple light sources in one embodiment of a lighting system.

In FIG. 4, a system embodiment is illustrated that introduces a fourth light source D into a planar system. Fourth light source D has intersource separation distances of $d_{AD}$ and $d_{BD}$ with respect to light sources A and B respectively. As when positioning light source C, above, light source D will fall on a circle having radius $h_D$ and which is normal to the x axis (equal to the AB axis as shown). In the case of a substantially two dimensional lighting system where all of the light sources are on a ceiling or a wall for example, the possible position of light source D can be reduced to one of two locations, $D_1$ or $D_2$, using the intersource separation distances $d_{AD}$ and $d_{BD}$. By introducing a third intersource separation distance (C to D) to the two dimensional system the position of light source D can be restricted to a single location because the intersource separation between C and $D_1$ is different than that of C and $D_2$. The lighting system can measure the actual intersource separation distance between C and D and this value will match, or come closer to, only one of either $d_{D1}$ or $d_{D2}$. As long as light source C is not collinear with A and B, then the intersource separation between C and D will restrict the position of light source D to either the point on the circle closest ($D_1$) or farthest ($D_2$) from C, depending on which of the two positions agrees most closely with the detected intersource separation distance.

Figure 5:
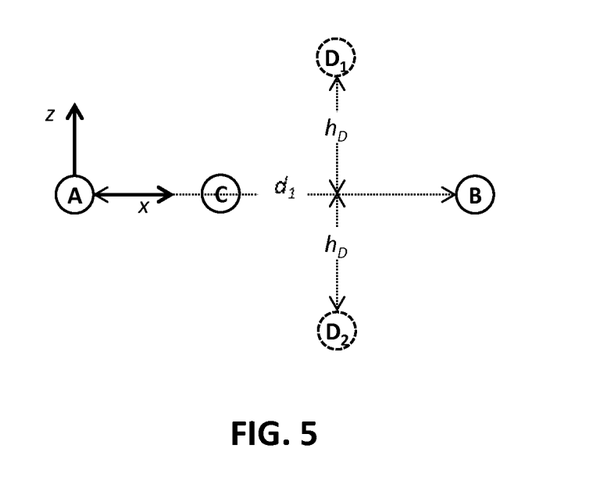
FIG. 5 is a diagram illustrating the relationship of one embodiment of light sources when seen in the x-z plane.

FIG. 5 illustrates an embodiment in which the light sources are in a three dimensional arrangement in which at least one of the light sources is outside of the x-y plane. Note that when compared to FIG. 4 the axes have been rotated 90 degrees around the x axis. After this rotation, light sources A, B and C are all in the x-y plane as shown. Light source D lies outside of the x-y plane. As in the example of FIG. 4, both $D_1$ and $D_2$ are equidistant from light sources A and B and therefore light source D is positioned at either $D_1$ or $D_2$ which mirror each other on the plane of reflection. Unlike FIG. 4, the addition of light source C does not restrict the location of D because there are two points, $D_1$ and $D_2$, that are equidistant from C. If the position of a fifth light source is known, and the fifth light source is not coplanar with ABC, the intersource separation between the fifth light source and light source D can be used to eliminate either $D_1$ or $D_2$ in the same manner as used for FIG. 4, above. Note that once the location of D is fixed, additional light sources can be uniquely located if adequate intersource separations can be measured. If no additional light source is available to provide the additional information, the light system can, in some embodiments, query a secondary system (e.g., camera, light sensor, magnetic field sensor) or a human to provide input that will narrow down the possible locations.

Figure 6:
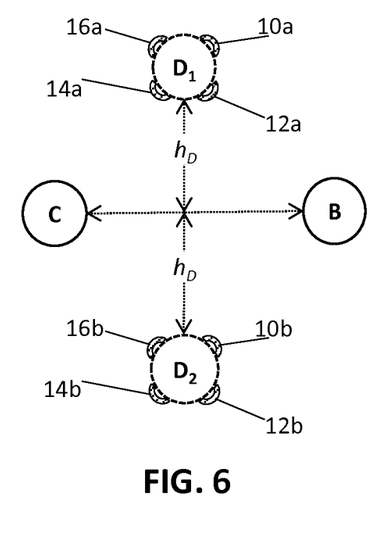
FIG. 6 is a diagram illustrating an embodiment where there are two possible locations for a single light source.

Secondary inputs to help narrow down the location of D (or similarly placed light sources) can include human input, computer input, or both. In some embodiments, one or more light sources can include one, two, three, four or more sensors or locators. Sensors can detect input from other sources such as light, sound, radio frequencies or electrical fields. Locators include, for example, mirrors or light absorbance zones that can reflect, shift or absorb electromagnetic radiation that is transmitted from another source such as a different light source in the system. Locators enable the transmitting source to detect the existence of a light source that includes the locator. For instance, a locator could reflect light back to a detector at the source or could absorb light from the source and emit light back to the source at a different wavelength. FIG. 6 provides a closer view of a portion of FIG. 5. In FIG. 6, light source D is equipped with four light sensors that are concave in shape. In other embodiments, the sensors may be flat or convex or of other shapes. As stated above, the sensors may also detect other stimuli such as sound or electrical fields. Light sensors 10, 12, 14 and 16 are evenly distributed in quadrants around light source D, and the respective sensors for each are identified by either subscript a or b. Recall that although there is only one light source D, it is unknown whether it is in position $D_1$ or $D_2$. A light source in a known position, for example light source C, is illuminated or flashed. During the period of illumination the output of each of light sensors 10, 12, 14 and 16 is measured and optionally recorded. If the highest signal is received at sensor 14, the position of light source D is narrowed down to $D_1$ because only in this position is sensor 14 most aligned with light source C for receiving maximum light energy. If the highest signal is received at sensor 16, then the position of light source D is narrowed down to $D_2$. In cases where the input from one light source may be indeterminate, one, two, three or more other light sources of known location can be illuminated, together or individually, to precisely narrow down the position of light source D. In these embodiments, the light sources do not need to be installed in a pre-determined pattern, but they can be installed so that particular sensors associated with each light source are oriented in a consistent manner. In an embodiment where each light source includes only one sensor, the light sources can be aligned with their sensors in the same direction so that when the sensor on one light source is directly illuminated the sensor on an oppositely positioned light source falls in the shadow of its own light source.

Figure 7:
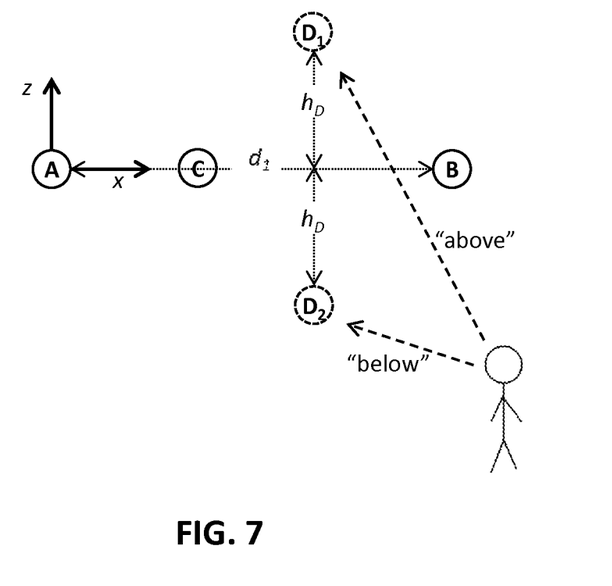
FIG. 7 is a diagram illustrating an embodiment where human input can be used to aid in narrowing down the location of a light source.

In another set of embodiments, human input can be used to narrow down the possible positions of one or more light sources. Referring to FIG. 7, light sources A, B and C are all in the x-y plane and therefore the lighting system can narrow down the location of D to either D1 or D2 but cannot eliminate either one. In this case, input from a human who can view the arrangement of the lighting system can be helpful. For example, different light sources in the system can be identified by, for example, turning them on or off, activating a blinking mode or changing to a different color or brightness. In a specific example shown in FIG. 7, light source B is red and light source A is green while unconfirmed light source D is blinking Note that blinking light source D will be at either $D_1$ or $D_2$, but not at both. The system can then query "with the red light to your right and the green light to your left, is the blinking light above or below the imaginary line connecting the red and green lights?" The observer can respond "above" to indicate position D1 and "below" to indicate position D2. Once this information is supplied to the system, the position of a light source outside the x-y plane has been uniquely determined and the intersource separation distances between various light pairs can be used to fix the position of numerous additional light sources in the lighting system. A number of additional observations can help narrow down the location of light sources. These observations include, for example, input regarding the one, two or three light sources that are farthest from the center of the installation. For instance, the light sources may be either the highest or the lowest in the lighting system. Once the system is aware of which light sources are at one of these extremes, it can determine that all other light sources must be either above (when the observed light source(s) are the lowest) or below (when the observed light source(s) are the highest). This allows the system to eliminate any possible locations that trilateration may indicate could be above the highest light sources or below the lowest light sources and allows the system to uniquely determine the actual relative position of one or more light sources.

Figure 8:
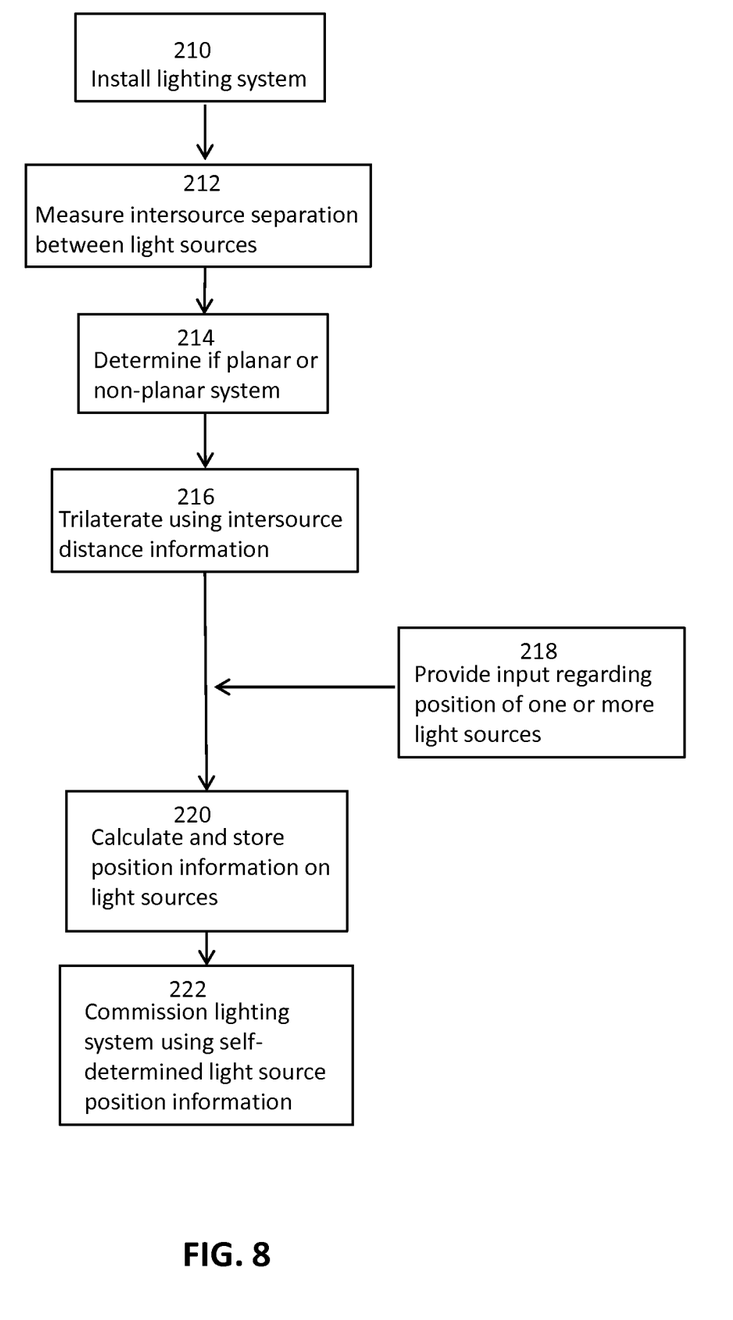
FIG. 8 provides a flow chart illustrating a methodology for self-determining the position of light source components in a given lighting system, according to an embodiment.
Figure 9:
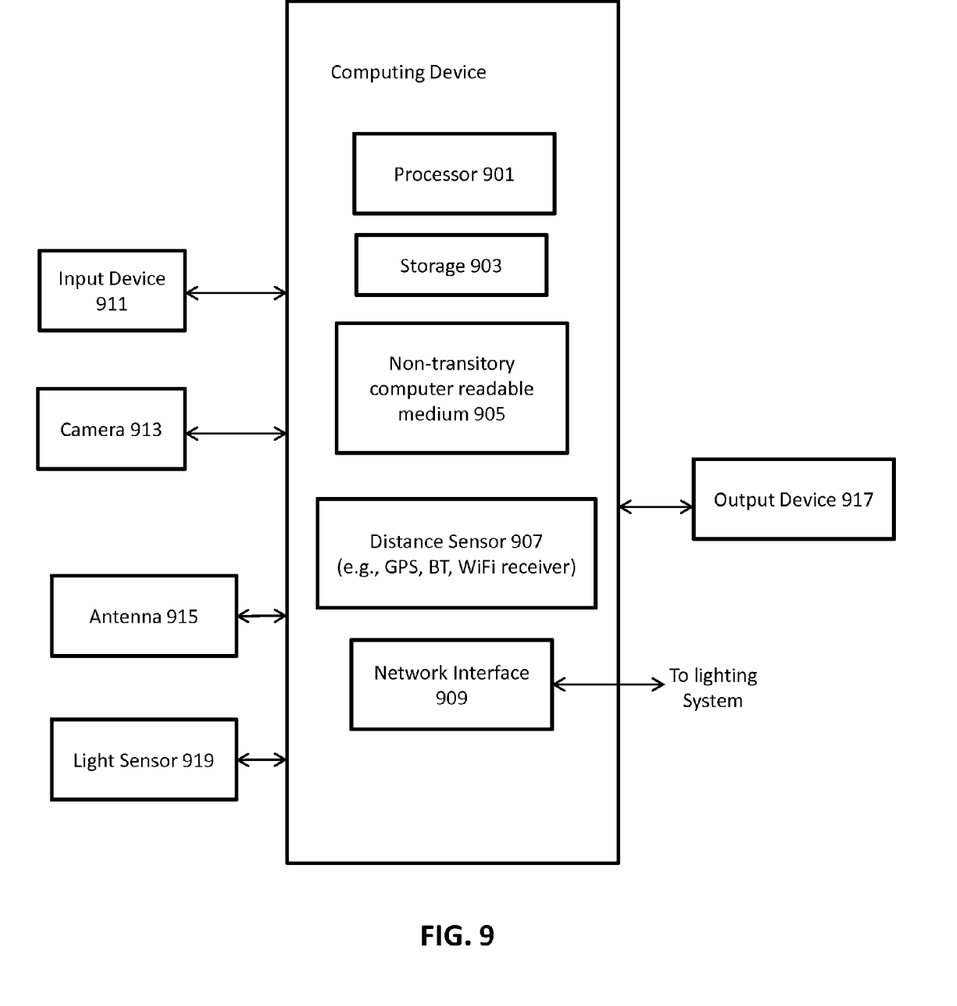
FIG. 9 is a block diagram representing an example computing device that may be used to perform any of the techniques as variously described herein, in accordance with some embodiments.

FIG. 8 provides a flow chart illustrating a methodology for self-determining the position of light source components in a given lighting system, according to an embodiment. The order of the steps can be varied, and any of the steps may be eliminated in particular embodiments. In step 210, the lighting system is installed. In this step, the light sources do not need to be placed in a pre-arranged pattern because the system will be capable of determining each light source's location after installation. In step 212, the intersource separation between light sources is determined and stored. In step 214, known information about the light system configuration can be provided to one or more processors accessible to the system (such as computing system integrated with or otherwise communicatively coupled to the lighting system, such as shown in FIG. 9). For example, the information may include whether or not the lighting system is a planar or a three dimensional system. This information may also be determined by the lighting system, an outside source, or can be pre-set as either planar or non-planar. Step 216 includes using the intersource data to determine the position of each light source using trilateration. In cases where outside information is useful in narrowing down the possible locations for one or more light sources, step 218 can be employed and a human or other system can provide information regarding specifics about one or more particular light sources. For example, a human may indicate that a light source of interest is to the right of the blinking lights. Or the human may indicate that lights A and B are the two highest lights in the three dimensional lighting system. In step 220, the relative position of each light source is stored, and in step 222 that stored information is used to commission the lighting system, a process that has been greatly simplified and shortened by using the relative positioning information provided by the lighting system.

To obtain complete knowledge of the physical arrangement of light sources and how they will interact, the orientation of each of the sources is required and could be obtained if the sources were equipped with appropriate sensors to determine angle and direction. However, the nature of many lighting systems is that specific or general orientations can be assumed to be downwards from a ceiling, or directed towards a central object or person, for example.

If a lighting system comprising multiple light sources has the ability to self-detect the relative physical arrangement of the sources, then the commissioning process for the system can be greatly simplified. For example, consider the case of a centrally lit object or person surrounded by a group of light sources, in which the illumination provided is spatially resolved so that the desired illumination from each lamp depends on its physical location. An initial commission procedure may require an installer to place specific light sources at specific locations, or at least record the device ID and physical coordinate for each installed light source. With automatic, or self-detecting spatial arrangement detection, the installer simply mounts the sources conveniently around the illumination target, then, using the methods described herein, the sources self-deduce their physical arrangement based on detected intersource separation values. For any given desired total illumination distribution, the desired contribution of each source can then be determined as a function of its location, with the appropriate lighting commands then sent to each individual light source. This saves time in both the set up process as well as the commissioning process. It can also compensate for any errors that might have been made in setting up the lighting system.

Self-determination of light source locations can also be useful in a space with movable light sources such as multipurpose space, perhaps equipped with a low voltage DC ceiling grid. Another useful application is in an open office space, where the configuration of the light sources could be self-determined by the lighting system. In the case where the distribution of light sources is not completely uniform, the output level of each light source could be adjusted according to the local fixture density (higher in areas of low fixture density, lower in areas of high fixture density) so that a uniform intensity could be obtained throughout the space. Such a system can also compensate for constraints such as dead spots where light sources cannot be physically placed. In addition, the location of the occupants relative to the light sources can be determined for occupants carrying a smartphone or ID badge with appropriate beaconing capability. In these cases, various context-aware illumination distributions such as lighting clouds or messaging in proximity of an occupant are possible while requiring minimal or no manual commissioning effort.

For aesthetic applications, sophistication in lighting can be achieved when there is a spatial variation to the illumination, in comparison to the limiting case where all light sources are outputting the same illumination. Color gradients can be added to provide aesthetic additions that improve standard monochromatic lighting systems. Dynamic effects can also be achieved such as, for example, an artificial moving sun that moves across the sky over the course of the day.

As indicated above, the lighting system may include or otherwise be communicatively coupled with a computing system. The computing system may generally include memory and one or more processors. Memory can be of any suitable type (e.g., RAM and/or ROM, or other suitable memory) and size, and in some cases may be implemented with volatile memory, non-volatile memory, or a combination thereof. A given processor may be configured as typically done, and in some embodiments may be configured, for example, to perform operations associated with its component light sources or with external inputs such as cameras, microphones or keyboards. In some cases, the memory may be configured to be utilized, for example, for processor workspace (e.g., for one or more processors) and/or to store media, programs, applications, and/or content on a host on a temporary or permanent basis. In some embodiments, the methodology of FIG. 8 can be implemented, at least in part, as one or more modules stored in memory that can be accessed for execution by, for example, the one or more processors of the lighting system. In accordance with some embodiments, a given module of memory can be implemented in any suitable standard and/or custom/proprietary programming language, such as, for example: (1) C; (2) C++; (3) objective C; (4) JavaScript; and/or (5) any other suitable custom or proprietary instruction sets, as will be apparent in light of this disclosure. The modules of memory can be encoded, for example, on a machine-readable medium that, when executed by a processor, carries out the functionality of a given self-determining lighting system, in part or in whole. The computer-readable medium may be, for example, a hard drive, a compact disk, a memory stick, a server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory can be implemented in hardware, software, and/or firmware, as desired for a given target application or end-use. In accordance with some embodiments, the memory may have stored therein (or otherwise have access to) one or more applications. In some instances, a given lighting system may be configured to receive input, for example, via one or more applications stored in memory (e.g., such as the origin, specific light source locations, planar or non-planar configuration, etc.). Other suitable modules, applications, and data which may be stored in memory will depend on a given application and will be apparent in light of this disclosure.

Example Computing Device

FIG. 9 is a block diagram representing an example computing device that may be used to perform any of the techniques as variously described herein. The computing device may be any computer system, such as a workstation, desktop computer, server, laptop, handheld computer, tablet computer, smartphone, or other form of computing or telecommunications device that is capable of communication and that has sufficient processor power and memory capacity to perform the operations described herein. A distributed computational system may be provided comprising a plurality of such computing devices. In some embodiments the computing device is integrated with a light system, while in other embodiments at least part of the computing system is remove from the lighting system where data is provided to the computing device one or more wired and/or wireless networks.

The computing device includes one or more storage devices 903 and/or non-transitory computer-readable media 905 having encoded thereon one or more computer-executable instructions or software for implementing typical computing device functionality as well as the techniques as variously described herein. The storage devices 903 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device 903 may include other types of memory as well, or combinations thereof. The storage device 903 may be provided on the computing device or provided separately or remotely from the computing device. The non-transitory computer-readable media 907 may include, but are not limited to, one or more types of hardware memory, non-transitory tangible media (for example, one or more magnetic storage disks, one or more optical disks, one or more USB flash drives), and the like. The non-transitory computer-readable media 907 included in the computing device may store computer-readable and computer-executable instructions or software for implementing various embodiments, such as the methodology illustrated in FIG. 8. The computer-readable media 907 may be provided on the computing device or provided separately or remotely from the computing device.

The computing device also includes at least one processor 901 for executing computer-readable and computer-executable instructions or software stored in the storage device 903 and/or non-transitory computer-readable media 905 and other programs for controlling system hardware. Virtualization may be employed in the computing device so that infrastructure and resources in the computing device may be shared dynamically. For example, a virtual machine may be provided to handle a process running on multiple processors so that the process appears to be using only one computing resource rather than multiple computing resources. Multiple virtual machines may also be used with one processor.

A user may interact with the computing device through one or more output devices 917, such as a screen or monitor which may display one or more user interfaces provided in accordance with some embodiments, an a microphone that may aurally present information to the user so that the user can provide voice commands back to the computing device. The output device(s) 917 may also display or otherwise present other aspects, elements and/or information or data associated with some embodiments. The computing device may further include various input devices 911 for receiving input from a user, for example, a keyboard, a pointing device (e.g., a mouse or trackpad.), a touch screen, and microphone. The computing device may include other suitable conventional I/O peripherals. The computing device can include and/or be operatively coupled to various devices such as a camera 917, one or more antennas 915 (e.g., GPS antenna, Bluetooth ®low energy antenna, Wi-Fi antenna, etc), distance sensor 907 (e.g., GPS receiver, Bluetooth ®low energy transceiver, Wi-Fi antenna transceiver, magnetic field sensor, etc), light sensor 919, and/or other suitable devices for performing one or more of the functions as variously described herein, such as identifying intersource separation between light sources (relative distance between light sources).

The computing device may include a network interface 909 configured to interface with one or more networks, for example, a Local Area Network (LAN), a Wide Area Network (WAN) or the Internet, through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 909 may include a built-in network adapter, network interface card, PCMCIA network card, card bus network adapter, wireless network adapter, USB network adapter, modem or any other device suitable for interfacing the computing device to any type of network capable of communication and performing the operations described herein. The network device 909 may include one or more suitable devices for receiving and transmitting communications over the network including, but not limited to, one or more receivers, one or more transmitters, one or more transceivers, one or more antennas, and the like.

The computing device may run any operating system, such as any of the versions of the Microsoft® Windows® operating systems, the different releases of the Unix and Linux operating systems, any version of the MacOS® for Macintosh computers, any version of the iOS® or any version of the Android™ OS for mobile devices, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

As will be appreciated, a general purpose computing device can be converting into a special purpose computer device configured in accordance with an embodiment by programming that computer device as provided herein, such as shown in the example embodiment of FIG. 8. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Numerous embodiments will be apparent in light of this disclosure. One example embodiment is a lighting system for detecting the relative position of its light source components, the lighting system comprising a first, second and third light source, each of the light sources at a different location in three dimensional space, at least one distance sensor associated with the lighting system, the distance sensor configured to determine the intersource separation distance between the first light source and the second light source, the first light source and the third light source, and the second light source and the third light source, and a processor configured to determine the three dimensional position of a third light source in relation to the first and second light sources using the intersource separation distances between the first and second light sources, the first and third light sources and the second and third light sources. The relative position of each light source can be determined without requiring the global position of any of the light sources. The three light sources can define a plane that is not vertical and not horizontal with respect to the surface of the earth. The system may also comprise a fourth and additional light sources. The fourth light source need not be in the same plane that is defined by the first second and third light sources. In some cases, at least one of the light sources includes a detector for sensing light, sound, magnetic fields or electric fields. The processor can use trilateration to locate the relative position of one or more of the light sources. The system can include a plurality of distance sensors associated with the light sources, the distance sensors selected from the group consisting of short-range wireless beacons, RFID tags and receivers and magnetic field sensors.

Another example embodiment is a method comprising determining the intersource separation distance between at least a first light source and a second light source, the first light source and a third light source, and the second light source and the third light source, the three light sources being components of a lighting system, calculating the position of additional light sources in relation to a first and second light source using the intersource separation distances and trilateration, and commissioning the lighting system based on the calculated position of at least one of the light sources. The method can include light sources that are substantially in the same plane or lighting sources that are in multiple planes. The method can include providing additional information regarding the relative position of at least one of the light sources, and may include querying a human regarding the position of at least one of the light sources. It may comprise providing non-distance based information to the lighting system regarding the relative position of one or more light sources. The method can also include taking an image of the lighting system to determine the location of one or more light sources. The method may include randomly installing the light sources without a predetermined pattern. The method can also include providing information to the lighting system regarding the location of the fourth light source in relation to a plane defined by the first second and third light sources. The intersource separation distance can be determined by detecting the distance between two light sources without requiring the absolute position in space for any of the light sources.

Another example embodiment is a non-transitory computer program product encoded with instructions that, when executed by one or more processors, causes a process to be carried out, the process comprising determining the intersource separation distance between a first light source and a second light source, between a first light source and a third light source, and between the second light source and the third light source; and using the intersource separation distances and trilateration to determine the relative positions of the first, second and third light sources. The intersource separation distances can be determined without requiring GPS coordinates for each light source. The instructions may also include using trilateration to find the position of fourth, fifth, sixth and additional light sources. The instructions may also allow for receiving data from a source such as a human or a camera and using that data to narrow down the number of possible locations for one or more light sources. The instructions can also include requesting an outside source, such as a sensor, a camera or a human to provide information regarding the relative position of a particular light source with respect to one or more light sources or with respect to the lighting system as a whole.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A lighting system for detecting the relative position of its light source components, the lighting system comprising:
   a first, second and third light source, each of the light sources at a different location in three dimensional space, wherein the third light source includes a plurality of detectors evenly distributed around the third light source that collect non-distance based information regarding the relative position of the third light source in relation to the first and second light sources;
   at least one distance sensor associated with the lighting system, the distance sensor configured to determine the intersource separation distance between the first light source and the second light source, the first light source and the third light source, and the second light source and the third light source; and
   a processor configured to:
      determine the three dimensional position of the third light source in relation to the first and second light sources using the intersource separation distances between the first and second light sources, the first and third light sources, the second and third light sources, and the non-distance based information;
      cause the first, second and third light sources to each display a different illumination mode when it is determined that there is more than one possible location for the three dimensional position of the third light source; and
      receive a user input to uniquely determine the three dimensional position of the third light source, wherein the user input is based on the different illumination modes of the first, second, and third light sources.

2. The lighting system of claim 1 wherein the three light sources are located in a plane that is not vertical and not horizontal with respect to the surface of the earth.

3. The lighting system of claim 1 comprising a fourth light source.

4. The lighting system of claim 3 wherein the fourth light source is not in a plane that includes the first, second and third light sources.

5. The lighting system of claim 1 wherein the plurality of detectors includes a detector for sensing light, sound, magnetic fields or electrical fields.

6. The system of claim 1 wherein the processor applies trilateration to locate the relative position of at least one of the light sources.

7. The lighting system of claim 1 further comprising a plurality of distance sensors associated with the light sources, the distance sensors selected from the group consisting of short-range wireless beacons, RFID tags and receivers and magnetic field sensors.

8. The lighting system of claim 1, wherein the illumination mode comprises one of a brightness, a color, a blinking mode, an on mode, and an off mode.

9. A method comprising:
   determining the intersource separation distance between at least a first light source and a second light source, the first light source and a third light source, and the second light source and the third light source the three light sources being components of a lighting system;
   receiving non-distance based information regarding the relative position of the third light source in relation to the first and second light sources from a plurality of detectors evenly distributed around the third light source;
   calculating the position of the third light source, in relation to the first and second light sources using the intersource separation distances, the non-distance based information, and trilateration;
   causing the first, second and third light sources to each display a different illumination mode when it is determined that there is more than one possible location for the position of the third light source; and
   receiving a user input to uniquely determine the position of the third light source, wherein the user input is based on the different illumination modes of the first, second, and third light sources; and
   commissioning the lighting system based on the position of the first, second, and third light sources.

10. The method of claim 9 wherein the lighting system comprises light sources in the same plane.

11. The method of claim 9 wherein the lighting system comprises light sources in multiple planes.

12. The method of claim 9 comprising receiving additional information at the lighting system regarding the relative position of at least one of the light sources.

13. The method of claim 9 comprising taking an image of the lighting system to determine the location of one or more light sources.

14. The method of claim 9 comprising randomly installing the light sources without a pre-determined pattern.

15. The method of claim 9 comprising providing information to the lighting system regarding the location of a fourth light source in relation to a plane that includes the first, second and third light sources.

16. The method of claim 9 wherein the intersource separation distance is determined by detecting the distance between two light sources without requiring the absolute position in space for any of the light sources.

17. The method of claim 9, wherein the illumination mode comprises one of a brightness, a color, a blinking mode, an on mode, and an off mode.

18. A non-transitory computer program product encoded with instructions that, when executed by one or more processors, causes a process to be carried out, the process comprising:
   determining the intersource separation distance between a first light source and a second light source, between a first light source and a third light source, and between the second light source and the third light source;
   receiving non-distance based information regarding the relative position of the third light source in relation to the first and second light sources from a plurality of detectors evenly distributed around the third light source;
   using the intersource separation distances, the non-distance based information, and trilateration to determine the position of the third light source;
   causing the first, second and third light sources to each display a different illumination mode when it is determined that there is more than one possible location for the position of the third light source; and
   receiving a user input to uniquely determine the position of the third light source, wherein the user input is based on the different illumination modes of the first, second, and third light sources.

19. The non-transitory computer program product of claim 18, wherein the illumination mode comprises one of a brightness, a color, a blinking mode, an on mode, and an off mode.

* * * * *